United States Patent
Eggensperger et al.

[11] 3,878,237
[45] Apr. 15, 1975

[54] PREPARATION OF (4-HYDROXY-3,5-DIALKYL-BENZYL) CARBOXYLIC ACID ESTERS

[75] Inventors: Heinz Eggensperger, Gadernheim Bensheim; Volker Franzen, Heidelberg; Karl-Heinz Diehl, Bensheim; Wilfried Kloss, Kolmbach Bensheim, all of Germany

[73] Assignee: Ciba-Geigy Corporation, Ardsley, N.Y.

[22] Filed: Dec. 4, 1972

[21] Appl. No.: 311,543

Related U.S. Application Data
[60] Division of Ser. No. 146,840, May 25, 1971, Pat. No. 3,830,828, which is a continuation of Ser. No. 661,191, Aug. 17, 1967, abandoned.

[30] Foreign Application Priority Data
Aug. 17, 1966  Germany................................ 50863

[52] U.S. Cl........... 260/465 D; 252/300; 260/15.85; 260/473 S
[51] Int. Cl...................... C07c 69/76; C07c 121/76
[58] Field of Search...................... 260/465 D, 473 S

[56] References Cited
UNITED STATES PATENTS

| | | | |
|---|---|---|---|
| 3,247,240 | 4/1966 | Meier et al. ......................... | 260/473 |
| 3,280,069 | 10/1966 | Knapp et al. .................... | 260/465 X |
| 3,496,172 | 2/1970 | Hinkley............................. | 260/465 |

*Primary Examiner*—Elbert L. Roberts
*Assistant Examiner*—Dolph H. Torrence
*Attorney, Agent, or Firm*—Fisher, Christen & Sabol

[57] ABSTRACT

Compounds of the formula

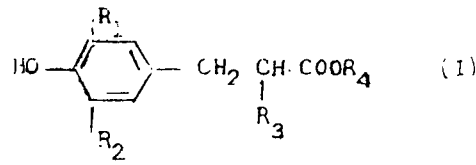

are prepared by reacting a Mannich base

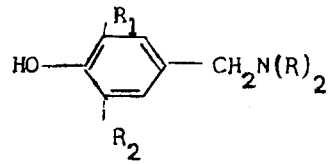

with a carboxylic acid ester of the formula

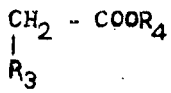

and are stabilizers for organic materials against deterioration by oxygen, light and heat.

In the formulae, $R_1$ and $R_2$ is alkyl, $R_3$ is —CN or —COOR$_4$, and $R_4$ is an alkyl, aralkyl, cycloalkyl, ether or thioether group.

5 Claims, No Drawings

PREPARATION OF (4-HYDROXY-3,5-DIALKYL-BENZYL) CARBOXYLIC ACID ESTERS

This is a division of application Ser. No. 146,840 filed May 25, 1971, now U.S. Pat. No. 3,830,822, said application being a streamlined continuation of application Ser. No. 661,191 filed Aug. 17, 1967, now abandoned.

This invention relates to novel stabilizers and a method for their preparation.

Said stabilizers have the formula

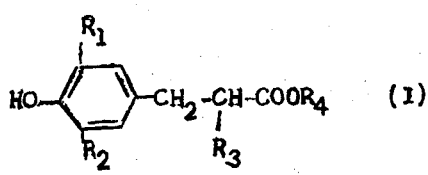

In said formula
$R_1$ and $R_2$ are the same or different, linear or branched alkyl groups of which at least one contains 1 to 6 carbon atoms and preferably at least one is linked with a tertiary C-atom to the aromatic nucleus $R_3$ is —CN or —COOR$_4$, and $R_4$ is a linear, branched, cyclic or aryl substituted alkyl, thioether, or ether group containing a total of 1–20 carbon atoms.

These compounds can be prepared in a simple manner in excellent yields by reacting a Mannich base of the general formula

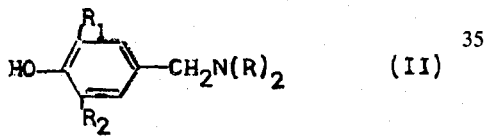

wherein $R_1$ and $R_2$ are as above and R is alkyl, preferably a lower alkyl, with a carboxylic acid ester of the general formula

wherein $R_3$ and $R_4$ are as above. The reaction is carried out in the presence of a catalytic amount of an alkali metal base or an alkaline earth metal base, preferably an alkali or alkaline earth metal alcoholate, in an anhydrous inert organic solvent.

The preparation of Mannich bases from phenols, formaldehyde and secondary amines is known.

Suitable solvents are hydrocarbons, glycol ethers and other high boiling ethers. Also alcohols $R_4OH$ can be used. We prefer to employ aromatic hydrocarbons.

A preferred mode of operation consists in refluxing one mole of the Mannich base with one mole of the carboxylic acid ester (malonic acid ester, cyanoacetic acid ester) in the presence of 1 to 20 g of alkali or alkaline earth metal alcoholate in about 1 liter of toluene, preferably in a nitrogen atmosphere, for 2 to 3 hours. After cooling, the catalyst is removed, e.g. by neutralization with diluted acid and extraction with water, the reaction mixture is dried, the solvent is distilled off, and the residue is purified, e.g., by recrystallization. The yield is about 70 to 90 percent of the theory.

The smooth course of reaction could not be expected because it was known, e.g., from the book by H. Hellmann and G. Opitz on "alpha-Aminoalkylation" (publ. by Verlag Chemie, Germany), p. 284, that phenol-Mannich bases can be C-alkylated, e.g., with malonic acid esters, only when the ammonium salts of the phenol bases are used as starting material, wherey said ammonium salts are difficult to prepare.

The following examples for the preparation of the compounds (I), and for their use as stabilizer, are given for their sake of illustration and without intention of limiting the invention to the specific details disclosed:

EXAMPLE 1

Preparation of (4-hydroxy-3-methyl-5-tert. butyl benzyl) malonic acid distearyl ester (Stabilizer II)

22.1 g (0.1 mole) of (3-methyl-5-tert. butyl-4-hydroxylbenzyl)-dimethylamine were refluxed with 60.9 g (0.1 mole) of malonic acid distearyl ester and 1 g of magnesium ethylate in 75 cc of toluene for 3 hours under nitrogen. the solution was then cooled and filtered from the magnesium ethylate; subsequently, the toluene was distilled off in vacuo, and the residue was recrystallized from acetone. There were obtained 71 g of (4-hydroxy-3-methyl-5-tert. butyl benzyl) malonic acid distearyl ester in a yield of 90 per cent of theory. $m = 69° – 71°C$.

In an analogous manner, the compounds listed in the following Table I were obtained. The substituents $R_1$, $R_2$, $R_3$ and $R_4$ refer to formula (I). The structure was determined on the basis of the IR spectra and by quantitative analysis.

TABLE I

| Stabilizer No. | $R_1$ | $R_2$ | $R_3$ | $R_4$ | melting point (°C) | yield (%) |
|---|---|---|---|---|---|---|
| | —CH$_3$ | tert.butyl | CN | —C$_2$H$_5$ | 160-162 | 67 |
| | —CH$_3$ | tert.butyl | COOR$_4$ | —CH$_3$ | 191-193 | 72 |
| | —CH$_3$ | tert.butyl | COOR$_4$ | —CH$_2$—CH—C$_4$H$_9$<br>    \|<br>    C$_2$H$_5$ | liquid | 84 |
| | —CH$_3$ | tert.butyl | COOR$_4$ | —CH$_2$—C$_6$H$_5$ | liquid | 69 |

TABLE I—Continued

| Stabilizer No. | $R_1$ | $R_2$ | $R_3$ | $R_4$ | melting point (°C) | yield (%) |
|---|---|---|---|---|---|---|
|  | $-CH_3$ | tert.butyl | $COOR_4$ | -⟨H⟩ | liquid | 73 |
|  | $-CH_3$ | tert.butyl | $COOR_4$ | $-CH_2CH_2OC_4H_9$ | 60-62 | 75 |
| I | $-CH_3$ | tert.butyl | $COOR_4$ | $-C_{10}H_{21}$ | 40-42 | 92 |
| II | $-CH_3$ | tert.butyl | $COOR_4$ | $-C_{18}H_{37}$ | 69-71 | 90 |
| III | tert.butyl | tert.butyl | $COOR_4$ | $-CH_2CH_2SC_{16}H_{33}$ | 37-40 | 74 |
| IV | tert.butyl | tert.butyl | $COOR_4$ | $-C_{18}H_{37}$ | 65-68 | 89 |
| V | isopropyl | isopropyl | $COOR_4$ | $-C_{18}H_{37}$ | 68-70 | 80 |

The compounds of formula I are good antioxidants and light and heat stabilizers for organic compounds, particularly for polymeric compounds such as polyolefins, polyamides, shock-resistant polystyrene-containing butadiene-styrene polymers, ABS polymers (copolymers of acrylonitrile, butadiene, and styrene), vegetable and animal oils and fats, plasticizers such as phthalates, and mineral oils.

Particularly good stabilizers are those of the formula

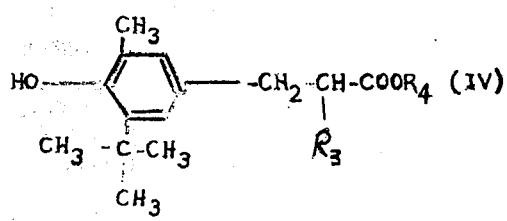

in which $R_4$ has the significance given above and contains a total of 4–20 C atoms.

Generally, we prefer esters of higher alcohols, particularly those which contain sulfur in ether linkage. Such esters are compatible with polymeric resins, fats and mineral oils and exert, due to their low volatility, a good stabilizing effect on these materials even after prolonged thermal stresses.

Generally, the stabilizers are used in an amount of 0.01 to 10 percent, calculated on the total weight of the material to be stabilized.

As the following examples, particularly example 5, show, our novel stabilizers have an improved stabilizing effect when compared with known purely organic stabilizers such as the mixtures of alkylated phenols (German DAS 1,035,137) thiobisphenols, and ω-(hydroxyalkyl-phenyl)-alkane carboxylic acid esters (German DAS 1,201,349). In contrast to the experience stated in the German DAS 1,201,349, in our stabilizers the character and number of the methylene groups which are between the carboxylate group, and the aromatic ring have considerable influence.

The new compounds can also be prepared by reacting benzyl halides of the formula

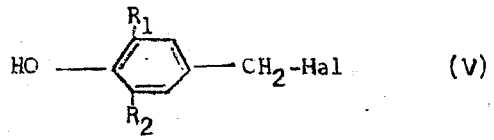

with alkali metal (e.g. sodium) derivatives of carboxylic acid esters of the formula

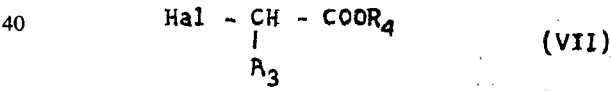

or by reacting 2,6-alkylated phenols with halogenated carboxylic acid esters of the formula $$Hal - \underset{R_3}{CH} - COOR_4 \qquad (VII)$$

Both methods are inferior to the above described preparation starting from the readily available Mannich bases and carboxylic acid esters because the starting compounds of formulae V and VII are more difficultly available.

The following examples illustrate the use of the novel compounds as stabilizers.

EXAMPLE 2

Stabilization of Polypropylene.

Two unstabilized polypropylene powders of melting index 1,6 of different origin (called A and B in Table II) were used. To 100 parts by weight of said powders, the stabilizers listed in Table II were added. All mixtures were treated for 10 minutes at 180°C on a laboratory roll mill, and the obtained films were pressed at 200 atm. and at a temperature of 210°C. From the obtained 1 mm thick sheets, 5 strips were cut out and subjected by storage in a drying cabinet at 150°C to an accelerated ageing; the time was determined after which an oxidative decomposition could be observed by the brittle test.

TABLE II

| Polypropylene | Stabilizer (parts by weight) | Brittle Test (days) |
|---|---|---|
| A | 0.5 stabilizer L | 38 |
| A | 0.5 stabilizer M | 38 |
| A | 0.5 stabilizer III | 66 |
| B | 0.2 stabilizer L 0.3 DLTDP | 49 |
| B | 0.2 stabilizer M 0.3 DLTDP | 57 |
| B | 0.2 stabilizer II 0.3 DLTDP | 71 |

Stabilizer L = 4,4'-thiobis-(6-tert.butyl-m-cresol)
Stabilizer M = β-(3,5-di-tert.butyl-4-hydroxy-phenyl)-propionic acid stearate
DLTDP = dilaurylthiodipropionate
Stabilizer II and III see Table I The results illustrate the superior effect of the stabilizers of the invention.

EXAMPLE 3

Stabilization of an ABS Resin (40% Styrene 40% Acrylnitrile 20% Butadiene)

Mixtures of 100 parts by weight of ABS with a stabilizer and 2 parts of 1,2-bis-stearoyl-aminoethane as lubricant were rolled on a laboratory roller mill for 10 minutes at 160°C, and the obtained films were pressed at a pressure of 200 atm. at a temperature of 180°C to sheets of 1 mm thickness. Test specimens cut from said sheets were stored in a drying cabinet at 110°C to produce accelerating ageing, and the effect of the stabilizers was determined by the discoloration and brittleness of the specimens. The results are given in Table III.

TABLE III

| Test No. | Stabilizer (parts by weight) | Color after 10 days | Time in drying cabinet before becoming brittle (days) |
|---|---|---|---|
| 1 | 0.5 2,6-di-tert.butyl phenol 0.25 2.6-dimethylphenol | light yellow | 37 |
| 2 | 0.5 stabilizer L | brown | 42 |
| 3 | 0.5 stabilizer I (Table I) | light yellow | 46 |
| 4 | 0.5 stabilizer III | pale yellow | 51 |

As the Table III shows, the stabilizers I and II of the invention exceed the stabilizing efficiency of the known stabilizers.

EXAMPLE 4

Stabilization of polyamides (Condensation products of dicarboxylic acid and diamines)

100 parts by weight of polyamide (Nylon 6,6) each were mixed with the stabilizers listed in Table IV and extruded at 250°C to sheets from which samples were cut and subjected to accelerated ageing in a drying cabinet at 140°C.

The stabilizing effect was determined by the brittleness of the samples. As will be seen from Table IV, the stabilizers of the invention exceed the effect of prior art antioxidants. Addition of phosphite improves considerably the early color of the extruded sheets.

TABLE IV

| Test No. | Stabilizer (parts by weight) | Brittle after days |
|---|---|---|
| 5 | 1 stabilizer L (Table II) | 44 |
| 6 | 1 stabilizer M (Table II) | 37 |
| 7 | 1 stabilizer IV (Table I) | 43 |
| 8 | 1 stabilizer III (Table I) | 38 |
| 9 | 0.5 stabilizer II (Table I) 0.5 trinonylphenylphosphite | 60 |

EXAMPLE 5

Stabilization of mineral oil

In tests 10–14, 100 g each of a mineral oil were mixed with the stabilizers listed in Table V, and 5 liters of oxygen were passed through the liquids for 90 minutes at 190°C. The produced decomposition was determined by the increased discoloration, measured by the Gardner color values, and by the increased viscosity. The mineral oil itself at the start of the tests had a Gardner color value of 3–4, and at 20°C a viscosity of 144 Cps.

TABLE V

| Test No. | Stabilizer | Gardner | Viscosity Cps at 20°C |
|---|---|---|---|
| 10 | 0.1 stabilizer L (Table II) | 14 | 165 |
| 11 | 0.1 stabilizer M (Table II) | 9 | 192 |
| 12 | 0.1 stabilizer I (Table I) | 7 | 180 |
| 13 | 0.05 stabilizer I (Table I) 0.05 trinonylphenyl phosphite | 9 | 165 |
| 14 | 0.05 2,4,6-tert.butyl phenol 0.05 2.4-dimethylphenol | 12 | 188 |

The table shows the good results obtained with the novel stabilizer, particularly when used together with a phosphite.

EXAMPLE 6

Stabilization of vegetable oils and plasticizers

The same stabilizers as employed in Table V were used in a similar manner for a vegetable oil (olive oil) and a plasticizer (dioctylphthalate). The results were similar to those obtained with the mineral oil.

We claim:
1. A process of preparing (4-hydroxy-3,5-dialkyl-benzyl) carboxylic acid esters of the formula

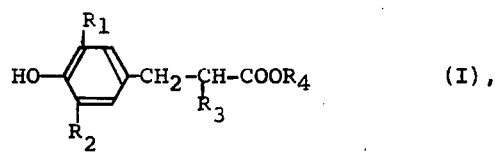

(I), wherein
$R_1$ and $R_2$ are alkyl groups at least one of which contains 1–6 carbon atoms, and
$R_3$ is —CN, $R_4$ being a member of the group consisting of alkyl, thioether, and ether radicals, said radicals containing 1 to 20 carbon atoms, comprising reacting in an anhydrous organic solvent a Mannich base of the formula

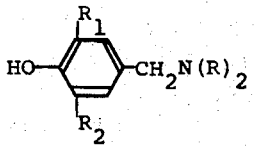

(II), in which R is lower alkyl, with a carboxylic acid ester of the formula

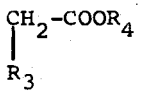

(III), $R_1$, $R_2$, $R_3$ and $R_4$ having the same significance as above in the presence of a catalytic amount of an alcoholate of a metal selected from the group consisting of alkali metal and alkaline earth metals.

2. The process as claimed in claim 1 wherein said solvent is an aromatic hydrocarbon.

3. The process as claimed in claim 1 wherein $R_1$ and $R_2$ are each alkyl groups containing 1–6 carbon atoms.

4. The process as claimed in claim 3 wherein at least one of $R_1$ and $R_2$ is linked with a tertiary C-atom to the aromatic nucleus.

5. The process as claimed in claim 1 wherein the reaction is conducted under reflux conditions.

* * * * *